US012246715B2

United States Patent
Schori

(10) Patent No.: US 12,246,715 B2
(45) Date of Patent: Mar. 11, 2025

(54) METHOD FOR CONTROLLING AN APPROACH OF A VEHICLE, DISTANCE CONTROL SYSTEM, COMPUTER PROGRAM, AND MEMORY UNIT

(71) Applicant: Robert Bosch GmbH, Stuttgart (DE)

(72) Inventor: Thorsten Schori, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 267 days.

(21) Appl. No.: 17/843,673

(22) Filed: Jun. 17, 2022

(65) Prior Publication Data
US 2023/0001927 A1   Jan. 5, 2023

(30) Foreign Application Priority Data

Jun. 30, 2021  (DE) ...................... 10 2021 206 863.4

(51) Int. Cl.
*B60W 30/00*  (2006.01)
*B60W 10/18*  (2012.01)
(Continued)

(52) U.S. Cl.
CPC ............ *B60W 30/16* (2013.01); *B60W 10/18* (2013.01); *B60W 40/04* (2013.01);
(Continued)

(58) Field of Classification Search
CPC .... B60W 30/16; B60W 10/18; B60W 50/085; B60W 2050/0083; B60W 2540/12;
(Continued)

(56) References Cited

U.S. PATENT DOCUMENTS

2002/0011366 A1*   1/2002  Fuchs ....................... B60T 7/22
                                                              180/169
2011/0276246 A1*  11/2011  Kuze ..................... B60W 30/16
                                                              701/96
(Continued)

FOREIGN PATENT DOCUMENTS

DE    102018201306 A1     8/2019
WO    WO-2018058273 A1 *  4/2018

OTHER PUBLICATIONS

Machine Translation of WO2018058273 (Year: 2018).*

*Primary Examiner* — Anne Marie Antonucci
*Assistant Examiner* — Jordan T Smith
(74) *Attorney, Agent, or Firm* — NORTON ROSE FULBRIGHT US LLP; Gerard A. Messina

(57) ABSTRACT

A method for controlling an approach of a driving vehicle to at least one preceding reference vehicle using an automated distance setting as a function of a setpoint distance between the vehicle and the reference vehicle. The setpoint distance is calculated as a function of an operating position of an operating element of the vehicle, which is actuatable by the driver of the vehicle and controls a drive of the vehicle. The setpoint distance being reduced directly or indirectly by actuating an actuating element of the vehicle, which has an actuating position, is actuatable by the driver of the vehicle, and controls a braking deceleration of the vehicle. A distance control system, a computer program, and a memory unit, as also described.

6 Claims, 3 Drawing Sheets

(51) Int. Cl.
*B60W 30/16* (2020.01)
*B60W 40/04* (2006.01)
*B60W 50/08* (2020.01)
*B60W 50/00* (2006.01)

(52) U.S. Cl.
CPC ... *B60W 50/085* (2013.01); *B60W 2050/0083* (2013.01); *B60W 2540/12* (2013.01); *B60W 2554/802* (2020.02)

(58) Field of Classification Search
CPC ....... B60W 2554/802; B60W 2754/30; B60W 10/04; B60W 40/107; B60W 2420/403; B60W 2420/408; B60W 2520/10; B60W 2540/10; B60W 2554/804
See application file for complete search history.

(56) References Cited

U.S. PATENT DOCUMENTS

| | | | | |
|---|---|---|---|---|
| 2012/0065863 A1* | 3/2012 | Takagi | ............... | B60W 30/16 701/96 |
| 2021/0129840 A1* | 5/2021 | Zhang | ............... | B60W 10/18 |
| 2023/0382378 A1* | 11/2023 | Jardine | ............... | B60W 30/17 |

* cited by examiner

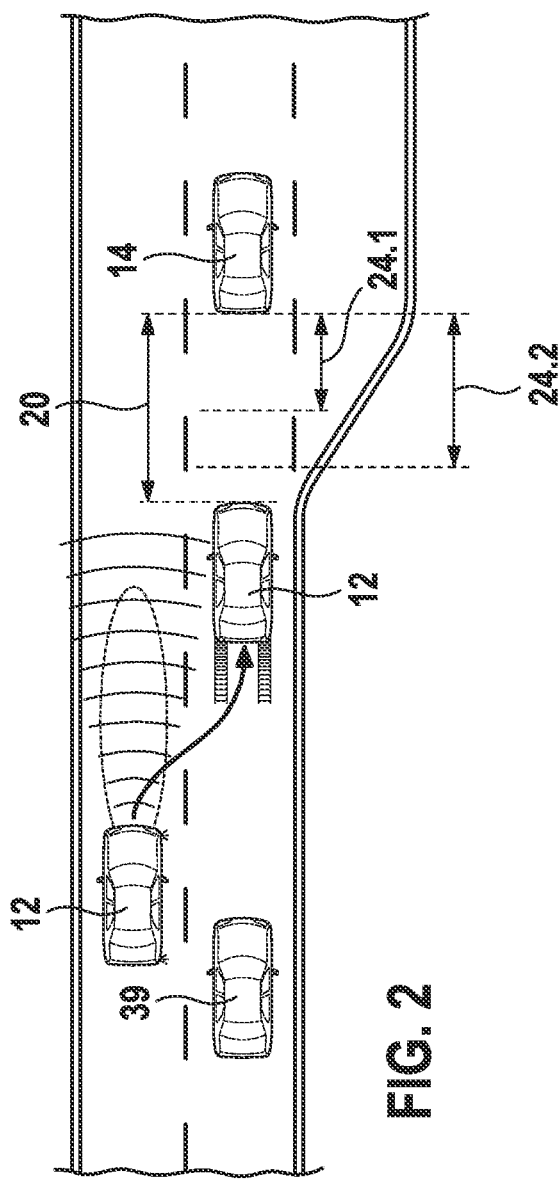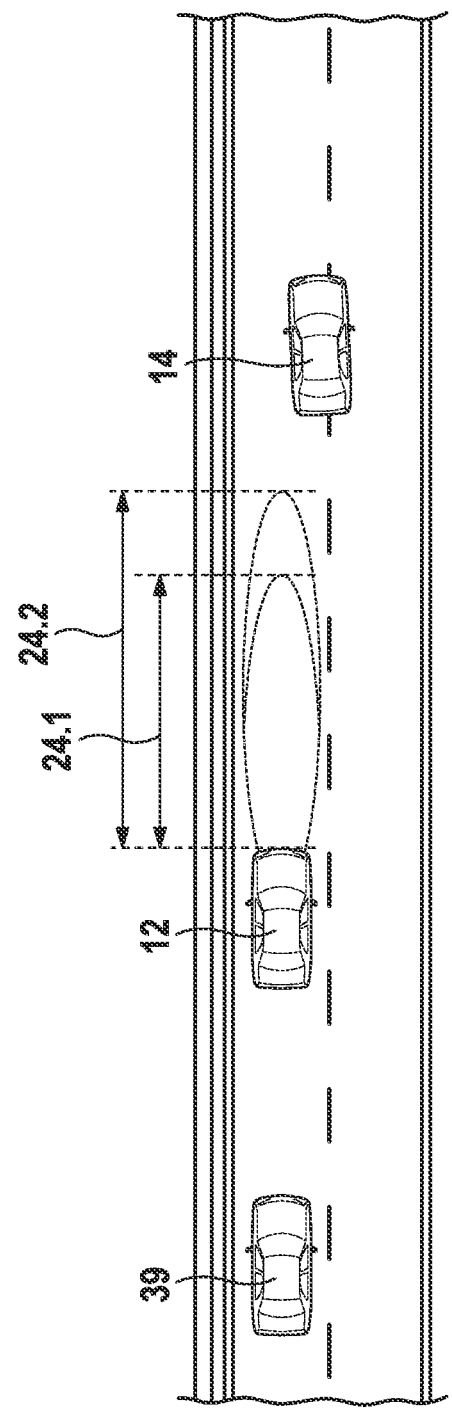

METHOD FOR CONTROLLING AN APPROACH OF A VEHICLE, DISTANCE CONTROL SYSTEM, COMPUTER PROGRAM, AND MEMORY UNIT

CROSS REFERENCE

The present application claims the benefit under 35 U.S.C. § 119 of German Patent Application No. DE 10 2021 206 863.4 filed on Jun. 30, 2021, which is expressly incorporated herein by reference in its entirety.

FIELD

The present invention relates to a method for controlling an approach of a driving vehicle to at least one preceding reference vehicle. Furthermore, the present invention relates to a distance control system, a computer program, and a memory unit.

BACKGROUND INFORMATION

A distance control system is described in German Patent Application No. DE 10 2018 201 306 A1, which reads in an accelerator pedal angle of an accelerator pedal of the vehicle to determine a distance target value of a vehicle to a preceding vehicle. A distance target value is determined using the read in values. The distance target value is transmitted to an acceleration control system. An acceleration setpoint value is calculated in a calculation unit of the acceleration control system using the distance target value and the accelerator pedal angle. The acceleration setpoint value is read in by an activation unit of the acceleration control system. In the activation unit, the acceleration setpoint value is converted into a drive control signal for a drive of the vehicle and/or a brake signal for a braking system of the vehicle.

SUMMARY

According to the present invention, a method is provided for controlling an approach of a driving vehicle to at least one preceding reference vehicle using an automated distance setting as a function of a setpoint distance between the vehicle and the reference vehicle. In accordance with an example embodiment of the present invention, the automated distance setting during the approach process may thus better correspond to the expectations of the driver. The automated distance setting may take place more reliably, realistically, and comfortably. The automated distance setting may be better adapted to the driving situation. The required free space may be available to the driving vehicle, in particular during merging processes of the vehicle or other vehicles ahead of and behind the vehicle.

The vehicle may be a motor vehicle, a passenger vehicle, a truck, a two-wheeled vehicle, or a comparable vehicle moving on a roadway. This also applies to the reference vehicle. The reference vehicle may drive ahead of the vehicle on the same lane or on an adjacent lane to the lane of the vehicle.

In accordance with an example embodiment of the present invention, the automated distance setting may incorporate an automated setting of the actual distance and/or an automated limiting of the actual distance at least to a minimum distance depending on the setpoint distance. The automated distance setting may be assigned to a driver-oriented assistance function, in particular a dynamic distance assist (DDA). In the automated distance setting, the function of the actuating element, preferably a brake pedal of the vehicle, may be at least partially assumed to set the braking deceleration. The automated distance setting may incorporate a surroundings detection by the vehicle. For example, a distance between the vehicle and the reference vehicle and/or from objects in the immediate surroundings of the vehicle may be measured by a distance sensor, for example, a radar sensor, a camera, and/or a LIDAR sensor. The operating element may be an accelerator pedal of the vehicle. The more strongly the operating element is actuated, the greater is the drive acceleration of the vehicle.

The actuating element may be a brake pedal of a braking device. The braking device may include at least one brake at a vehicle wheel of the vehicle. The brake may be a disk brake. At least when the automated distance setting is deactivated, the braking deceleration of the vehicle is greater the more strongly the actuating element is actuated.

The automated distance setting preferably remains active when the actuating element is actuated. The braking deceleration of the vehicle may be automatically adapted by the automated distance setting. The setpoint distance may be calculated directly as a function of the deflection of the actuating element and/or a time gradient of a deflection of the actuating element. The setpoint distance may be calculated directly as a function of a braking parameter directly influenceable by the actuating position and therefore indirectly as a function of the actuating position. The braking parameter may be a brake pressure of the braking device. The greater the brake pressure, the more strongly may the braking deceleration be carried out via the braking device.

The setpoint distance may furthermore be calculated as a function of an actual velocity of the vehicle, a differential velocity between the vehicle and the reference vehicle, an actual distance between the vehicle and the reference vehicle, and/or an actual distance between the vehicle and a following vehicle driving behind it. Furthermore, a predefined setpoint distance may be taken into consideration, for example, by the driver via a user interface of the vehicle with the driver, in particular a switch and/or a touchscreen.

In one preferred example embodiment of the present invention, it is advantageous if the setpoint distance is reduced as a function of the actuating position. The automated distance setting may thus be adapted to the driving situation. In one special embodiment of the present invention, it is advantageous if the setpoint distance is reduced more strongly the more strongly the actuating element is actuated. A more critical driving situation may thus be managed in an appropriate and safe manner in the automated distance setting. The braking device, which is prepared via the actuation of the actuating element or already effectuates a braking deceleration, may provide a possibly requested even stronger brake power faster.

In one advantageous example embodiment of the present invention, it is provided that the setpoint distance is reduced more strongly by actuating the actuating element than if the actuating element and/or the operating element is unactuated and/or if the operating element is actuated. The braking torque, which is prepared or already active when actuation of the actuating element has already taken place, may implement a braking deceleration of the vehicle faster. The setpoint distance may thus be reduced more strongly by actuating the actuating element.

A lesser minimum distance may be predefined between the vehicle and the reference vehicle by actuating the actuating element than a minimum distance if the actuating element and/or the operating element is unactuated and/or if the operating element is actuated.

In one preferred example embodiment of the present invention, it is advantageous if the actuating position incorporates a deflection of the actuating element and/or a time gradient of a deflection of the actuating element. The strength and/or speed of the actuation of the actuating element may thus be incorporated in the reduction of the setpoint distance. One preferred embodiment of the present invention is advantageous in which the actuating element is a brake pedal and the actuating position is a brake pedal angle. The brake pedal angle may be greater the more strongly the actuating element is actuated.

The setpoint distance is preferably reduced as a function of the operating position of the operating element. Driving closer to the reference vehicle may thus be effectuated by actuating the accelerator pedal. It may be made possible for the driver to influence the setpoint distance with automated distance setting.

According to the present invention, furthermore a distance control system is provided, which is configured to carry out the method including at least one of the above-described features directly or indirectly. The distance control system may be implemented in a control device of the vehicle. The control device may be situated in the vehicle.

In accordance with an example embodiment of the present invention, in the distance control system or a post-regulator downstream thereof, additional driving properties of the vehicle may be taken into consideration on the input side when negotiating curves. Furthermore, the distance control system or the post-regulator, for example, an acceleration control system, may take into consideration on the input side an actual velocity of the vehicle, a differential velocity between the vehicle and the reference vehicle, and/or an actual distance between the vehicle and the reference vehicle. Furthermore, an actual distance between the vehicle and a following vehicle driving behind same may be taken into consideration. Furthermore, a predefined setpoint distance may be taken into consideration, for example, by the driver via a user interface of the vehicle with the driver, in particular a switch and/or a touchscreen.

According to the present invention, furthermore a computer program is provided, which includes machine-readable instructions executable on at least one computer, upon the execution of which the above-described method runs.

According to the present invention, furthermore a memory unit is provided, which is machine-readable and is configured to be accessible by at least one computer and on which the above-mentioned computer program is stored.

Further advantages and advantageous embodiments of the present invention result from the description of the figures and the figures.

BRIEF DESCRIPTION OF THE DRAWINGS

The present invention is described in detail hereinafter with reference to the figures.

FIG. 2 shows a driving situation of a vehicle during an approach to a preceding reference vehicle.

FIG. 3 shows a further driving situation of a vehicle during an approach to a preceding reference vehicle.

DETAILED DESCRIPTION OF EXAMPLE EMBODIMENTS

Figure 1:
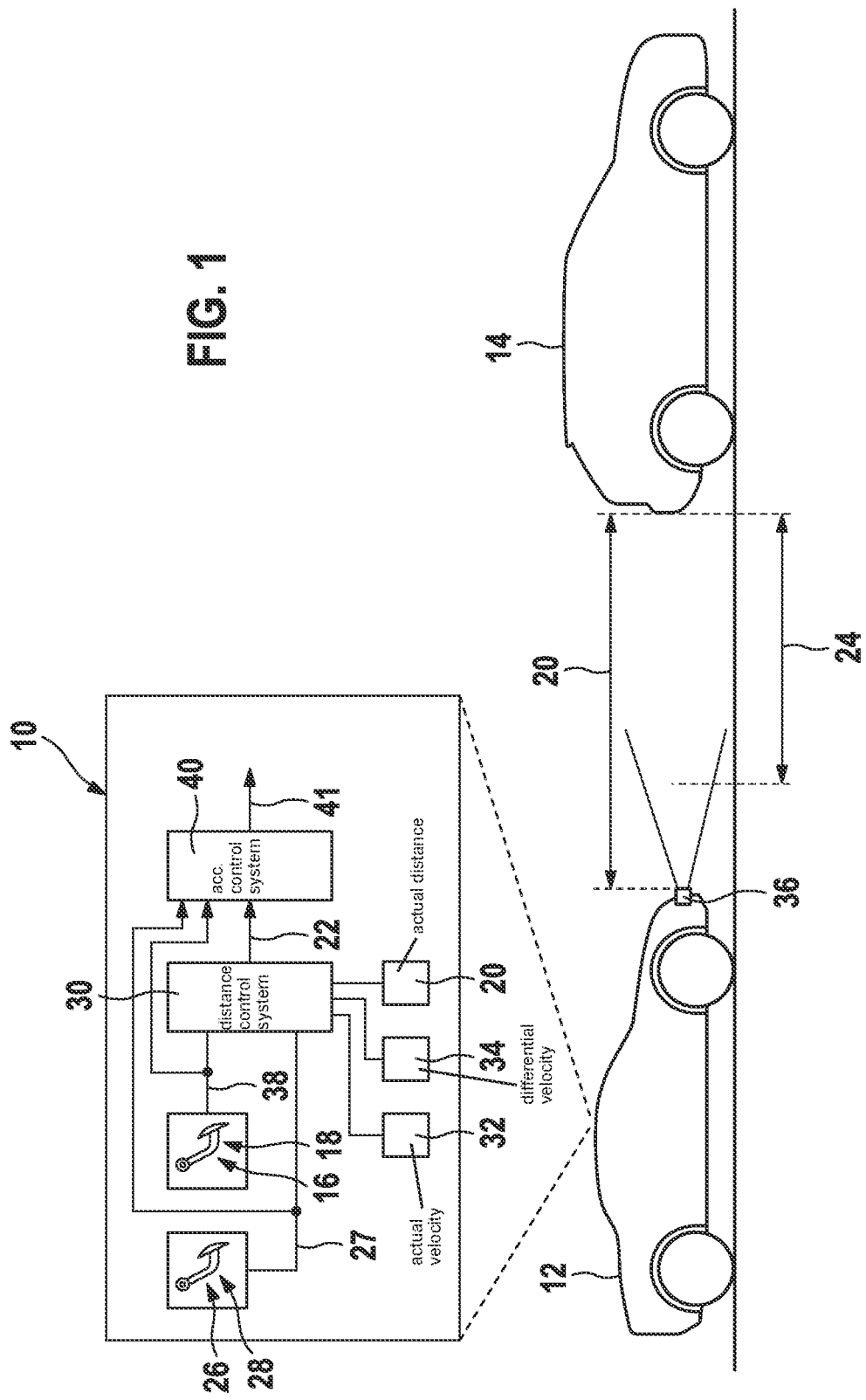
FIG. 1 shows a method for controlling an approach of a vehicle in one special specific example embodiment of the present invention.

FIG. 1 shows a method for controlling an approach of a vehicle in one special specific embodiment of the present invention. Method 10 for controlling an approach of a driving vehicle 12 to at least one preceding reference vehicle 14 is carried out using an automated distance setting, in which a driver-oriented assistance function is implemented, which as much as possible is to relieve the driver of vehicle 12 from the actuation of an actuating element 16 for controlling a braking deceleration of vehicle 12, preferably a brake pedal 18.

During the automated distance setting, a braking deceleration of vehicle 12 for complying with an actual distance 20 between vehicle 12 and reference vehicle 14 may take place in an automated manner. For this purpose, a setpoint distance 22 is calculated, via which the automated distance setting sets actual distance 20, for example, by a braking process of vehicle 12. A minimum distance 24 is also calculated, which actual distance 20 is not to fall below in order to meet the safety requirements, in particular to avoid an impact of vehicle 12 on reference vehicle 14.

In the automated distance setting, preferably the actuation of an operating element 26, which controls a drive of vehicle 12 for its movement, is detected and an operating position 27 of operating element 26, for example, an accelerator pedal 28, is transferred to a distance control system 30 with further input-side parameters, such as a predefined setpoint distance, for example, by the driver via a user interface of the vehicle with the driver, in particular a switch and/or a touchscreen, an actual velocity 32 of vehicle 12, a differential velocity 34 between vehicle 12 and reference vehicle 14, and/or actual distance 20 between vehicle 12 and reference vehicle 14. Actual distance 20 may be measured by a distance sensor 36, for example, a radar sensor, a camera, and/or a LIDAR sensor.

Furthermore, actuating position 38 of actuating element 16 is detected and setpoint distance 22 is calculated by distance control system 30 as a function of the further input-side parameters and output at an acceleration control system 40. Setpoint distance 22 is reduced as a function of operating position 27 of operating element 26 and an actuation of actuating element 16, preferably as a function of actuating position 38 of actuating element 16. An influence of the driver on the automated distance setting may thus be implemented in that he/she actuates actuating element 16 or operating element 26. The strength of the reduction of setpoint distance 22 is preferably a function of actuating position 38. For example, setpoint distance 22 may be reduced more strongly the more strongly actuating element 16 is actuated.

A driving situation is shown by way of example in FIG. 2, in which vehicle 12 merges from one lane to an adjacent lane, on which a reference vehicle 14 is already located which drives ahead of vehicle 12, and a following vehicle 39, which drives behind vehicle 12 on the adjacent lane. The driver of vehicle 12 intends, for example, to exit from the roadway via the secondary lane and an exit lane extending adjacent thereto. For this purpose, vehicle 12 merges with activated automated distance setting between reference vehicle 14 and following vehicle 39 on the adjacent lane.

If vehicle 12 has a higher velocity than reference vehicle 14, vehicle 12 would then be braked more strongly using the automated distance setting to maintain actual distance 20 to reference vehicle 14. If the driver of vehicle 12 actuates the brake pedal in the meantime while the vehicle merges onto the adjacent lane, the distance control system may then reduce the setpoint distance as a function of the actuating position of the brake pedal as an input-side parameter and avoid an excessively strong braking process of vehicle 12, due to which following vehicle 39 would possibly drive into vehicle 12.

A minimum distance 24.1 between vehicle 12 and reference vehicle 14 may also be set lower by actuating the actuating element than if the actuating element remained unactuated, in particular because the braking torque which is prepared or already active when actuation of the actuating element has already taken place may implement a braking deceleration of vehicle 12 faster. A lower minimum distance 24.1 between vehicle 12 and reference vehicle 14 may thus be predefined by actuating the actuating element than a minimum distance 24.2 if the actuating element and/or the operating element remained unactuated and/or than if the operating element were actuated.

A driving situation is shown for comparison in FIG. 3, in which a reference vehicle 14 driving ahead of vehicle 12 merges from an adjacent lane onto the lane on which vehicle 12 is driving. If the driver of vehicle 12 recognizes reference vehicle 14 merging onto his/her lane at lower velocity, a lesser setpoint distance to reference vehicle 14 is permitted by an actuation of the brake pedal of vehicle 12 and the setpoint distance reduced via the distance control system than if the brake pedal remained unactuated, but thus possibly prevents driving into a following vehicle 39 behind vehicle 12, since the actual distance between vehicle 12 and following vehicle 39 is greater due to the reduced actual distance between vehicle 12 and reference vehicle 14.

In particular minimum distance 24.1 may also be set lower here by actuating the actuating element, thus the brake pedal, than a minimum distance 24.2 if the actuating element remained unactuated, in particular because the braking torque which is prepared or already active when actuation of the actuating element has already taken place may implement a braking deceleration of vehicle 12 faster to avoid driving into reference vehicle 14.

Returning to FIG. 1, acceleration control system 40 also receives on the input side, in addition to setpoint distance 22 output by distance control system 30, actuating position 38 of actuating element 16 and operating position 27 of operating element 26 and outputs a setpoint acceleration 41 as a function thereof, which may be negative as a braking deceleration or positive as a drive acceleration and implements the automated distance setting.

Figure 4:
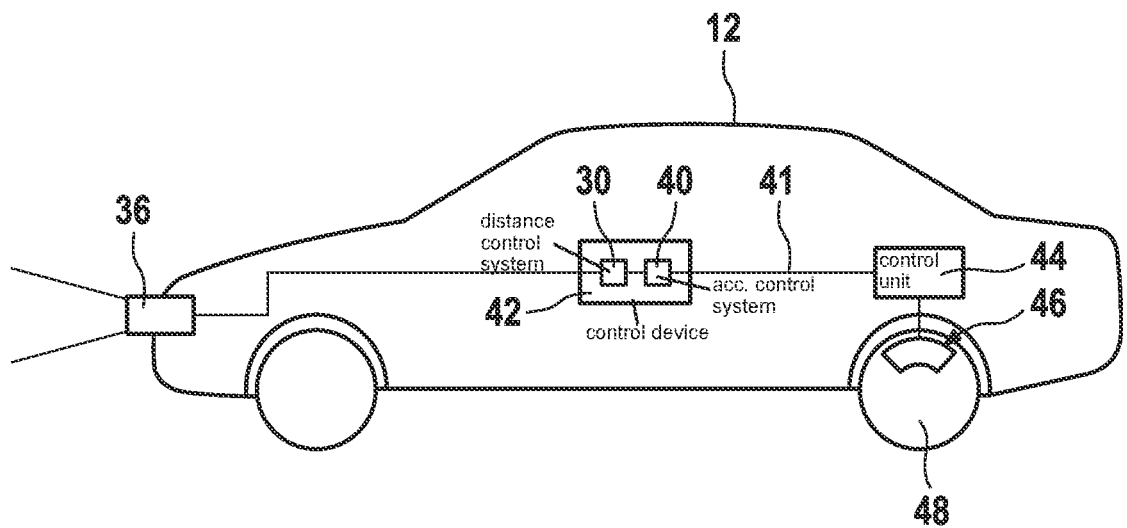
FIG. 4 shows a vehicle including a distance control system in one special specific embodiment of the present invention.

FIG. 4 shows a vehicle including a distance control system in a special specific embodiment of the present invention. Vehicle 12 includes a control device 42, with which distance control system 30 for calculating the setpoint distance upon approach of vehicle 12 to a preceding reference vehicle by applying an automated distance setting is assigned. Distance control system 30 may take into consideration on the input side an actual velocity of vehicle 12, a differential velocity between vehicle 12 and the reference vehicle, and/or an actual distance between vehicle 12 and the reference vehicle. The actual distance may be measured by a distance sensor 36, for example, a radar sensor, a camera, and/or a LIDAR sensor.

The setpoint distance calculated by distance control system 30 is output to an acceleration control system 40. Acceleration control system 40 may also be assigned to control device 42. Acceleration control system 40 calculates as a function of the setpoint distance a setpoint acceleration 41, which is output to a control unit 44. Control unit 44 controls a braking device 46 at vehicle wheels 48 to carry out the actual braking deceleration of vehicle 12 for the automated distance setting.

What is claimed is:

1. A method for controlling a driving vehicle, for which a minimum inter-vehicle distance is predefined, the controlling being performed when the driving vehicle is changing from a first lane into a second lane in which a reference vehicle is present at a longitudinally more forward position than the driving vehicle, the controlling being performed using an automated distance setting, the method comprising the following steps:
based on a manual actuation by a driver to change an actuating position of an actuating element of the vehicle to brake the vehicle during the changing of the vehicle from the first lane to the second lane, reducing a minimum inter-vehicle distance that has been predefined for the driving vehicle; and
controlling a braking deceleration of the vehicle according to the reduced minimum inter-vehicle distance.

2. The method as recited in claim 1, wherein the reduction is performed such that the more strongly the manual actuation by which the actuating position of the actuating element is changed, the more by which the minimum inter-vehicle distance is reduced.

3. The method as recited in claim 1, wherein the actuating position incorporates a time gradient of a deflection of the actuating element.

4. The method as recited in claim 1, wherein the actuating element is a brake pedal and the actuating position is a brake pedal angle.

5. A distance control system configured to control a driving vehicle, for which a minimum inter-vehicle distance is predefined, the control being performed when the driving vehicle is changing from a first lane into a second lane in which a reference vehicle is present at a longitudinally more forward position than the driving vehicle, the controlling being performed using an automated distance setting, the distance control system configured to:
based on a manual actuation by a driver to change an actuating position of an actuating element of the vehicle to brake the vehicle during the changing of the vehicle from the first lane to the second lane, reduce a minimum inter-vehicle distance that has been predefined for the driving vehicle; and
control a braking deceleration of the vehicle according to the reduced minimum inter-vehicle distance.

6. A non-transitory machine-readable memory unit on which is stored a computer program for controlling a driving vehicle, for which a minimum inter-vehicle distance is predefined, the controlling be performed when the driving vehicle is changing from a first lane into a second lane in which a reference vehicle is present at a longitudinally more forward position than the driving vehicle, the controlling being performed using an automated distance setting, the computer program, when executed by a computer, causing the computer to perform the following steps:
based on a manual actuation by a driver to change an actuating position of an actuating element of the vehicle to brake the vehicle during the changing of the vehicle from the first lane to the second lane, reducing a minimum inter-vehicle distance that has been predefined for the driving vehicle; and controlling a braking deceleration of the vehicle according to the reduced minimum inter-vehicle distance.

\* \* \* \* \*